(12) United States Patent
Garland et al.

(10) Patent No.: US 10,182,401 B2
(45) Date of Patent: Jan. 15, 2019

(54) WEARABLE APPARATUS AND NETWORK FOR COMMUNICATION THEREWITH

(71) Applicant: Acticheck Ltd, Saffron Walden, Essex (GB)

(72) Inventors: Bill Garland, Littlebury (GB); Karl Gibbs, Saffron Walden (GB); Mark Marsden, Saffron Walden (GB)

(73) Assignee: Acticheck Ltd, Saffron Walden (GB)

( * ) Notice: Subject to any disclaimer, the term of this patent is extended or adjusted under 35 U.S.C. 154(b) by 0 days.

(21) Appl. No.: 15/301,419

(22) PCT Filed: Apr. 2, 2015

(86) PCT No.: PCT/EP2015/057385
§ 371 (c)(1),
(2) Date: Oct. 3, 2016

(87) PCT Pub. No.: WO2015/150547
PCT Pub. Date: Oct. 8, 2015

(65) Prior Publication Data
US 2017/0127354 A1    May 4, 2017

(30) Foreign Application Priority Data
Apr. 4, 2014   (GB) .................................. 1406167.5

(51) Int. Cl.
*H04W 52/02* (2009.01)
*G06F 1/16* (2006.01)
(Continued)

(52) U.S. Cl.
CPC ........ *H04W 52/0254* (2013.01); *G06F 1/163* (2013.01); *G06F 1/1698* (2013.01); *G06F 1/3231* (2013.01); *G06F 1/3296* (2013.01); *G06F 3/011* (2013.01); *G06F 3/016* (2013.01); *H04B 1/385* (2013.01); *H04W 4/023* (2013.01); *H04W 4/027* (2013.01);
(Continued)

(58) Field of Classification Search
CPC ................................................. H04W 52/0254
See application file for complete search history.

(56) References Cited

U.S. PATENT DOCUMENTS

| | | | |
|---|---|---|---|
| 2003/0076051 A1* | 4/2003 | Bowman ............ | H05B 33/0815 315/200 A |
| 2007/0182581 A1* | 8/2007 | Elwell ................ | H05B 37/0227 340/6.11 |

(Continued)

FOREIGN PATENT DOCUMENTS

| | | |
|---|---|---|
| EP | 2 629 486 | 8/2013 |
| WO | WO 2011/092584 | 8/2011 |
| WO | WO 2013/093638 | 6/2013 |

OTHER PUBLICATIONS

PCT International Search Report, PCT/EP2015/057385, dated Sep. 15, 2015.

*Primary Examiner* — Christopher M Brandt
(74) *Attorney, Agent, or Firm* — Leveque IP Law, P.C.

(57) ABSTRACT

An apparatus comprising a processor, at least one transceiver, a sensor configured to sense the presence of a user, wherein the processor is configured to cause the at least one transceiver to transmit information indicative of a user status only when the proximity sensor senses the presence of a user.

17 Claims, 3 Drawing Sheets

10

(51) Int. Cl.

| | | |
|---|---|---|
| G06F 1/32 | (2006.01) | |
| G06F 3/01 | (2006.01) | |
| H04B 1/3827 | (2015.01) | |
| H04W 4/02 | (2018.01) | |

(52) U.S. Cl.
CPC ......... *H04W 52/0274* (2013.01); *Y02D 70/00* (2018.01); *Y02D 70/1262* (2018.01); *Y02D 70/142* (2018.01); *Y02D 70/144* (2018.01); *Y02D 70/166* (2018.01); *Y02D 70/26* (2018.01)

(56) References Cited

U.S. PATENT DOCUMENTS

2009/0076405 A1\* 3/2009 Amurthur ............ A61B 5/0002
600/529
2014/0077945 A1\* 3/2014 Amagai ................. A63B 21/00
340/539.11

\* cited by examiner

Figure 4

WEARABLE APPARATUS AND NETWORK FOR COMMUNICATION THEREWITH

The invention relates to wearable devices for user monitoring, particularly wearable devices for monitoring vulnerable users.

People living at home are at risk of accidents and emergencies without access to immediate help. This can be of concern to themselves, their careers, and their friends and families. Warning systems exist which allow a user to activate a panic alarm if they require emergency assistance. These panic alarms may involve pull cords, a button or switch on a wall, or a panic button worn close to a person. Once the panic alarm is activated, a central system is alerted which can then provide assistance to the user.

These systems however, can be ungainly. They may be difficult to operate, particularly for a user with mobility or dexterity problems. If a user has suffered an accident they may not be able to reach the panic button. On the converse side, it may be too easy to activate a panic device, particularly when worn close to a person, resulting in false alarms which can be worrisome to a family and a nuisance to the user. If the device is too much of a nuisance to the user, they will not wear it, negating the effect of the panic system. If a device requires frequent charging, a user may find it difficult to keep the device operational. In addition, the user-worn device may not be suitable for all activities, such as swimming, bathing and sleeping.

It would thus be desirable to produce an improved personal alert system which overcomes these problems.

In a first aspect there is provided an apparatus comprising a processor, at least one transceiver, a sensor configured to sense the presence of a user, wherein the processor is configured to cause the at least one transceiver to transmit information indicative of a user status only when the sensor senses the presence of a user.

The sensor may be configured to sense the presence of a user comprises a capacitive skin sensor.

The apparatus may comprise a sensor for detecting a body parameter.

The apparatus may comprise at least one of an accelerometer and a temperature sensor.

The apparatus may comprise an LED for visual feedback or a speaker for audible feedback.

The apparatus may comprise a vibrator for providing haptic feedback.

The vibrator may be of adjustable intensity.

The apparatus may comprise an energy source for powering the at least one transceiver, processor and at least one sensor.

The energy source may comprise at least one battery.

The processor may be configured to cause the intensity of the vibrator to stay constant as the battery power decreases.

The energy source may be configured to reduce its power output when the sensor configured to sense the presence of a user confirms the absence of a user.

The processor may configure all other sensors into low power mode when the user presence sensor confirms the absence of a user.

The apparatus may comprise a user input device.

The user input device may comprise at least one of a switch, a temperature sensor, a voice input device and an accelerometer.

The at least one transceiver may be configured to operate on one of two or more frequency bands or protocols.

The apparatus may comprise a first transceiver configured to operate on a first frequency band or protocol and a second transceiver configured to operate on a second frequency band or protocol.

The at least one transceiver may be configured to transmit a signal at a first time interval.

The transceiver may be configured to transmit a signal at a second time interval when the user presence sensor confirms the absence of a user, wherein the second time interval is greater than the first interval.

The transceiver may be configured to transmit a signal in response to one of a received signal or a user input.

The transceiver may be configured to transmit a signal in response to a sensor reading outside an allowed range.

The apparatus may be a unitary apparatus.

The apparatus may be a wearable device.

In a second aspect there is provided an apparatus comprising a processor, at least one transceiver; wherein the apparatus is configured to operate on a plurality of frequency bands or protocols and wherein the processor is configured to cause the at least one transceiver to operate on one of the plurality of frequency bands or protocols in dependence of the energy required to operate on the respective frequency band or protocol.

In a third aspect there is provided a processor, at least one transceiver; wherein the apparatus is configured to operate on a plurality of frequency bands or protocols and wherein the processor is configured to cause the at least one transceiver to operate on one of the plurality of frequency bands or protocols in dependence of interference detected from a respective frequency band or protocol.

The following are applicable to both the second and third aspect.

The apparatus may comprise a sensor for detecting a body parameter.

The apparatus may comprise at least one transceiver configured to operate on a plurality of frequency bands or protocols.

The apparatus may comprise a first transceiver configured to operate on a first frequency band or protocol and a second transceiver configured to operate on a second frequency band or protocol.

The transceiver may be configured to transmit a signal at a first time interval.

The apparatus may comprise a sensor configured to sense the presence of a user, wherein the processor is configured to cause the at least one transceiver to transmit information indicative of a user status only when the sensor senses the presence of a user.

The sensor configured to sense the presence of a user comprises a capacitive skin sensor.

The transceiver may be configured to transmit a signal at a second time interval when the user presence sensor confirms the absence of a user, wherein the second time interval is greater than the first interval.

The transceiver may be configured to transmit a signal in response to one of a received signal or a user input.

The transceiver may be configured to transmit a signal in response to a sensor reading outside an allowed range.

The apparatus may comprise at least one of an accelerometer and a temperature sensor.

The apparatus may comprise an LED for visual feedback or a speaker for audible feedback.

The apparatus may comprise a vibrator for providing haptic feedback.

The vibrator may be of adjustable intensity.

The apparatus may comprise an energy source for powering the at least one transceiver, processor. and at least one sensor.

The energy source may comprise at least one battery.

The processor may be configured to cause the intensity of the vibrator to stay constant as the battery power decreases.

The energy source may be configured to reduce its power output when the sensor configured to sense the presence of a user confirms the absence of a user.

The processor may configure all other sensors into low power mode when the user presence sensor confirms the absence of a user The apparatus may comprise a user input device.

The user input device may comprise at least one of a switch, a voice input device, a temperature sensor and an accelerometer.

The apparatus may be a unitary apparatus.

The apparatus may be a wearable device.

In a fourth aspect there is provided a communications system comprising an apparatus as described above, a first network access point, a second network access point, wherein the at least one transceiver is selectively connectable to the first network access point via a first frequency band or protocol and to the second network access point by a second frequency band or protocol in dependence of the energy required to operate on the respective frequency band or protocol or in dependence of interference detected from a respective frequency band or protocol.

The communication system may comprise a server comprising a memory configured to store a central database, the server accessible from the Internet.

The first access point may be a mobile phone or tablet.

The second access point may be a wireless local area network access point.

In a fifth aspect there is provided a method comprising using a sensor of an apparatus to confirm the presence of a user; and causing information indicative of a user status to be sent from the apparatus to a device connected to the internet if the user presence is confirmed.

The apparatus may comprise an apparatus as described above.

In a sixth aspect there is provided a method comprising selecting, at a wearable device configured to operate on a plurality of frequency bands or protocols, one of the plurality of frequency bands or protocols in dependence of the energy required to operate on the respective frequency band or protocol and causing said wearable device to operate in the selected frequency band or protocol.

The wearable device may comprise at least one transceiver configured to operate on a plurality of frequency bands or protocols.

The wearable device may comprise a first transceiver configured to operate on a first frequency band or protocol and a second transceiver configured to operate on a second frequency band or protocol.

The method may comprise determining the energy required to operate on the respective frequency band or protocol in dependence of at least one of the probability that the frequency and/or protocol will be available, the probability that the frequency and/or protocol will remain available, the energy required to detect the radio frequency and/or protocol, the energy required to establish a connection via the radio frequency or protocol and the energy required to transmit and receive data via the frequency and/or protocol.

The method may comprise determining the energy required to operate on the respective frequency band or protocol in dependence of parameters received from a database.

The method may comprise, wherein the wearable device is operating on a first frequency band or protocol, determining the energy required to operate on the first frequency band or protocol and causing said wearable device to operate on the respective frequency band or protocol if the energy required is less than the energy required to operate on the first frequency band or protocol.

The method may comprise sending, from the transceiver on the selected frequency band or protocol, a signal in response to one of a received signal or a user input.

The method may comprise sending, from the transceiver, a signal at a first time interval.

The method may comprise sending, from the transceiver, a signal at a second time interval.

The signal may comprise configuration information.

The signal may comprise user status information.

In a seventh aspect there is provided a method comprising selecting, at a wearable device configured to operate on a plurality of frequency bands or protocols, one of the plurality of frequency bands or protocols in dependence of interference detected from a respective frequency band or protocol and causing said wearable device to operate in the selected frequency band or protocol.

The method may comprise, when the wearable device is operating on a first frequency band or protocol, detecting interference from a respective frequency band or protocol and causing said wearable device to operate on a second frequency band or protocol, the second frequency band or protocol having less interference from the respective frequency band or protocol than the first frequency band or protocol.

The first frequency band may be 863 to 870 MHz, the interferer is an LTE device and the second frequency band and protocol is Bluetooth.

The wearable device may comprise at least one transceiver configured to operate on a plurality of frequency bands or protocols.

The wearable device may comprise a first transceiver configured to operate on a first frequency band or protocol and a second transceiver configured to operate on a second frequency band or protocol.

The method may comprise sending, from the transceiver on the selected frequency band or protocol, a signal in response to one of a received signal or a user input.

The method may comprise sending, from the transceiver, a signal at a first time interval.

The method may comprise sending, from the transceiver, a signal at a second time interval.

The signal may comprise configuration information.

The signal may comprise user status information.

In an eighth aspect there is provided a computer program product comprising computer executable instructions which when run are configured to perform the method described above.

The present invention will now be described with reference to the figures in which.

Figure 1:
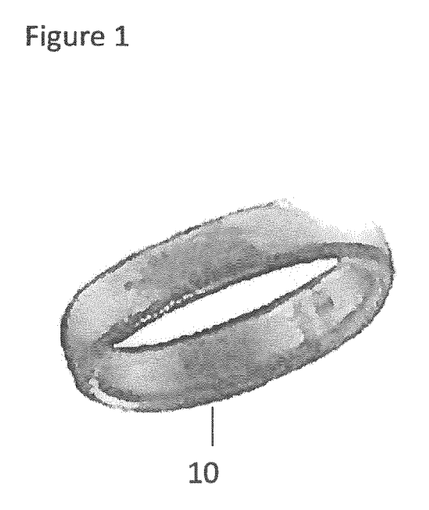
FIG. 1 shows a wearable monitoring and triggering apparatus.
Figure 2:
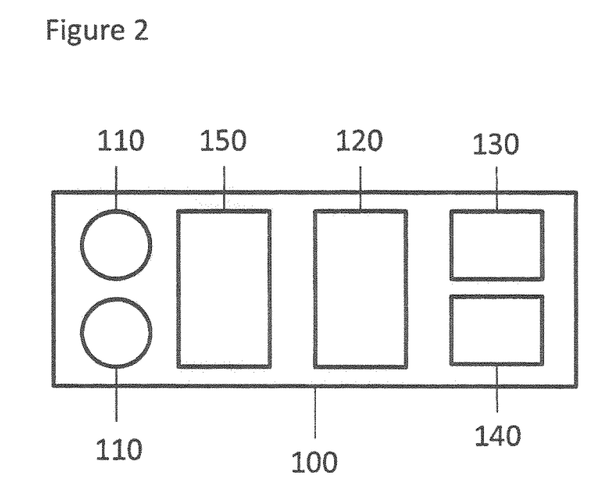
FIG. 2 shows a block diagram of elements of a user wearable device.

FIG. 1 shows a wearable monitoring and triggering device 10. The device may be a wearable device worn round the wrist of a user or elsewhere, for example, round the ankle. Alternatively, the device may be worn close to the skin for example it may be introduced into clothing to be worn next to the skin, it may be attached to a chain or clip to be worn by a user as a broach or a badge, or it could be implanted into the user. The device may comprise a button or a plurality of buttons for user input. Other input devices, such as a switch or a voice input receiver may be included. The wearable device comprises a circuit 100 board including a processor, as shown in FIG. 2. The wearable device 10 may be completely sealed, for example using a plastic over-moulding process, so that the circuit 100 is hidden from the user. This can provide additional comfort to the user. Sealing of the circuit 100 also allows the device to be worn continuously, for example during bathing, as it is waterproof.

As shown in FIG. 2, the circuit 100 comprises a skin proximity device 120. The skin proximity device 120 can detect the presence of a user. The skin proximity device 120 may be a capacitive skin sensor. Although the term "skin proximity device" is used, any device which is able to establish the presence or absence of a user may be included, for example a near field chip or RFID chip implanted under the skin of a user which communicates with the wearable device 10 or a micro-movement detector which is sufficiently sensitive to detect the presence of a user. The wearable device 10 may comprise additional sensors 130 for measuring other body parameters, such as a temperature detector, a motion detector such as a three-axis accelerometer and/or a glucose monitor.

An accelerometer may be used as an input device. For example, the accelerometer can detect tapping or moving the device in a predetermined manner. An accelerometer can also be used as a fall indicator, since it can detect motion indicative of a fall.

The wearable device 10 includes an energy source. The energy source may be at least one battery 110. Alternatively, the wearable device 10 may be powered by energy harvesting, e.g. energy harvested from the movement of the body. In this instance, kinetic energy from the body is converted to potential, kinetic, electric or magnetic energy, stored for example in a pressure chamber, capacitor, inductor or a battery. Alternative methods such as chemical or biological reactions which are body based may also be used to provide energy to an energy storage device. Super capacitors are an example of energy storage devices which may be used. Where a "battery" is referred to throughout the description, any suitable device which provides power to the device is understood to be included.

The wearable device 10 comprises a vibrator 140 which can be used to provide haptic feedback to the user. During setup of the device for the user, the intensity of the vibration can be set at a level which is appropriate to the user. It should be comfortable and non-intrusive, yet noticeable so that the user will respond as required. The intensity of the vibration should stay constant. As a battery, or energy source, loses power, the vibration level would be expected to decrease, increasing the likelihood that a user will not notice the vibration. In the present device, as the battery power levels decrease, methods are used to ensure that the vibration level appears constant to the user. An open or closed feedback loop may be used to monitor vibration intensity. Alternative means of providing feedback such as a light source, e.g. an LED, or a sound generator may be provided instead of or in addition to the vibrator 140.

Figure 3:
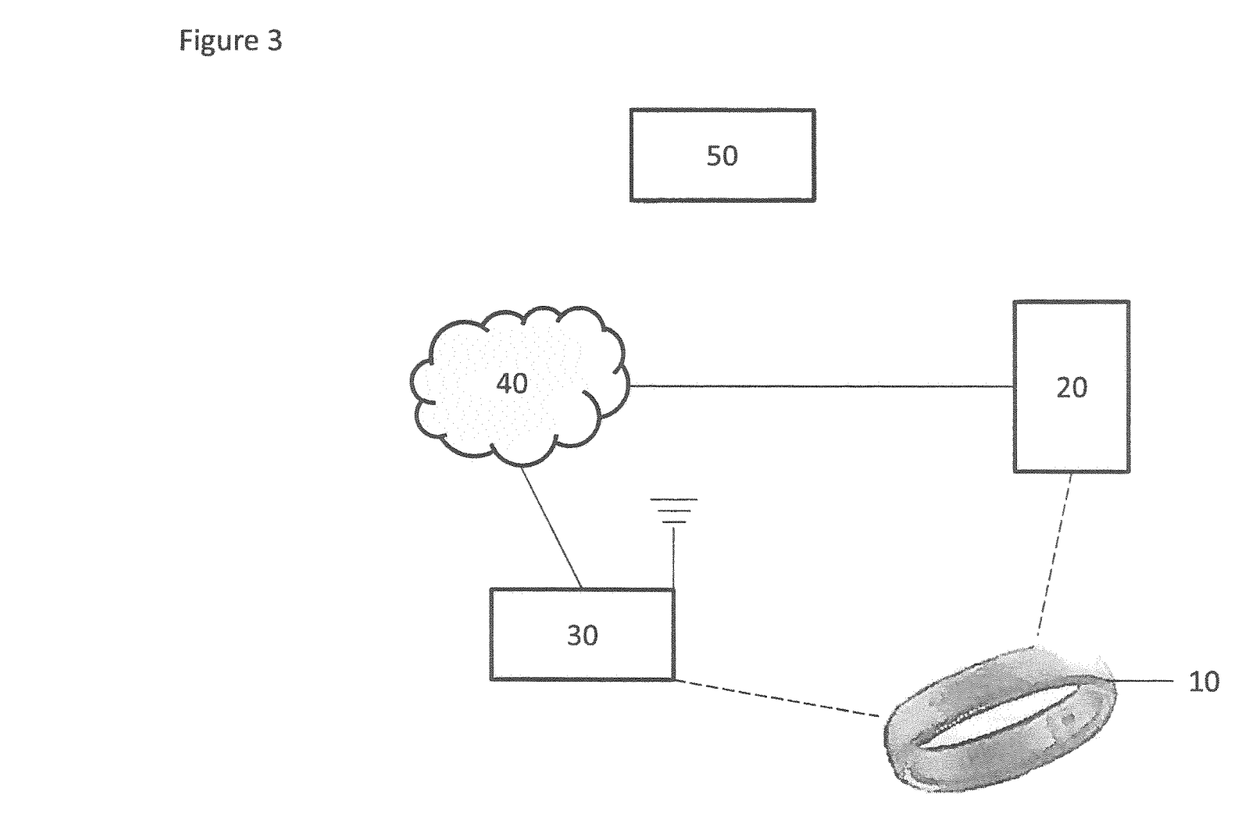
FIG. 3 shows a communication network for a user wearable device.

The circuit 100 also includes at least one transceiver 150 for signalling to a central database via a network such as that shown in FIG. 3. The transceiver 150 is used to transmit and receive data to and from a network access point and can connect to one or more access points as shown in FIG. 3. In particular the transceiver 150 obtains user data from the sensors for transmission to a central database. The one transceiver 150 may be a radio transceiver that can operate on a plurality of different frequency bands and/or protocols. Alternatively, the circuit 100 may include a plurality of transceivers, each able to operate on a respective frequency band or protocol.

Energy conservation is a significant factor for a user apparatus of such a personal alert system so that the user apparatus does not require frequent charging. For example it would be desirable to achieve a battery life of up to two years. When the processor detects that battery power is reduced, it may cause all the hardware of the device to operate in a low power mode. For example, operating the sensors and transceivers in low power mode.

The energy usage may also be affected by the sampling frequency of the sensors and the rate of transmission. Providing power to the accelerometer is a significant power consumption element for the wearable device 10. For example, in a situation where fall detection is desired, the accelerometer may be monitored effectively continuously, e.g. once a second. The movement may or may not be logged by the wearable device 10 which also affects energy usage.

If a user does not require fall detection, for example if the device is worn to monitor a lone worker, the accelerometer may log only the orientation of the wearable device 10 every update period. Such a reduction in sampling frequency could increase battery life by at least half in comparison to the situation where the accelerometer is monitored continuously.

FIG. 3 shows a network comprising a wearable device 10 such as that shown in FIG. 2, a first access point which in embodiments may be a smartphone terminal 20 and a second access point which in embodiments may be a dedicated access point 30 connected to an internet access router. The transceiver(s) 150 of the smart band 10 are selectively connectable to the smartphone terminal 20 and the access point 30. The access point 30 and the smartphone terminal 20 are connectable via the internet 40 to a, remote, central server database 50. The smartphone terminal may be connectable to the internet using, for example, but not limited to 2G, 3G or LTE wireless access technology.

The wearable device 10 can operate in two modes. In mode 1 a transceiver 150 may use a proprietary frequency and protocol (for example an ISM band) and in mode 2 a transceiver 150 may use a different frequency and protocol (for example Bluetooth). Each mode has different characteristics such as range, energy consumption, reliability and availability. When both modes are available, there are circumstances where the device can save energy by switching from the current mode to the alternative mode.

The access point 30 provides a termination of the proprietary radio link to the transceiver 150 of the wearable device 10. The wearable device 10 may connect to the access point 30 using a long-range low-latency radio link. The access point can then connect via a user's internet access router to the internet 40 using a wired or wireless access technology. An enhanced access point may connect to a mobile data network if a user does not have internet connectivity.

An application run on a terminal such as a smartphone 20 can provide an alternative termination point for the transceiver 150. The alternative termination point may be used if the user is away from home and thus not in proximity to the access point 30. A smartphone 20 may communicate with the wearable device 10 by Bluetooth Smart (previously known as Bluetooth Low Energy), and to a remote database 50 via the internet 40. A terminal such as a smartphone 20 can connect to the internet 40 either via a mobile data network using, for example, but not limited to 2G, 3G or LTE wireless access technology, or WLAN. If the proprietary band is operating in a frequency range close to that of the mobile radio frequency S and causing interference, it may be easier for the communication from the transceiver 150 to terminate at the smartphone 20. The transceiver 150 may connect with the smartphone 20 using a radio link, such as a Bluetooth link. A Bluetooth link may be low energy. The smartphone 20 may provide location information to the database 50 using the location services integrated in the smartphone terminal 20. Thus, location information can be provided even when the user is away from a fixed access point without requiring location services to be integrated in the wearable device 10 which may cause a significant drain on energy resources.

The access point 30 and/or the smartphone 20 can receive parametric information from the wearable device 10. The database 50 receives parametric information from the access point 30 and the smartphone 20. These parameters may include the following.

Geo-location,
Wearable Device accelerometer readings
Ambient temperature
Wearable device temperature
Wearable device battery voltage
Radio link quality parameters
Signal level received by the wearable device
Signal levels received by the access point diversity receivers
Listen-before-transmit back-off event counts
Transmission retry attempts
Transmission frame or packet errors These parameters are received by the database 50 and are used to derive further parameters which can be sent to the access point 30, smartphone 20 and wearable device 10. The database 50 can also be used to provide configuration information to the wearable device. Using a central database to store and derive parameters and provide them to the user system reduces the processing power required at the wearable device, thereby improving energy conservation.

If the wearable device 10 is able to connect to both a smartphone terminal 20 and an access point 30, e.g. if the wearable device 10 is in proximity to both the smartphone terminal and the access point 30, the wearable device 10 may decide which termination point to use based on minimizing energy consumption.

Figure 4:
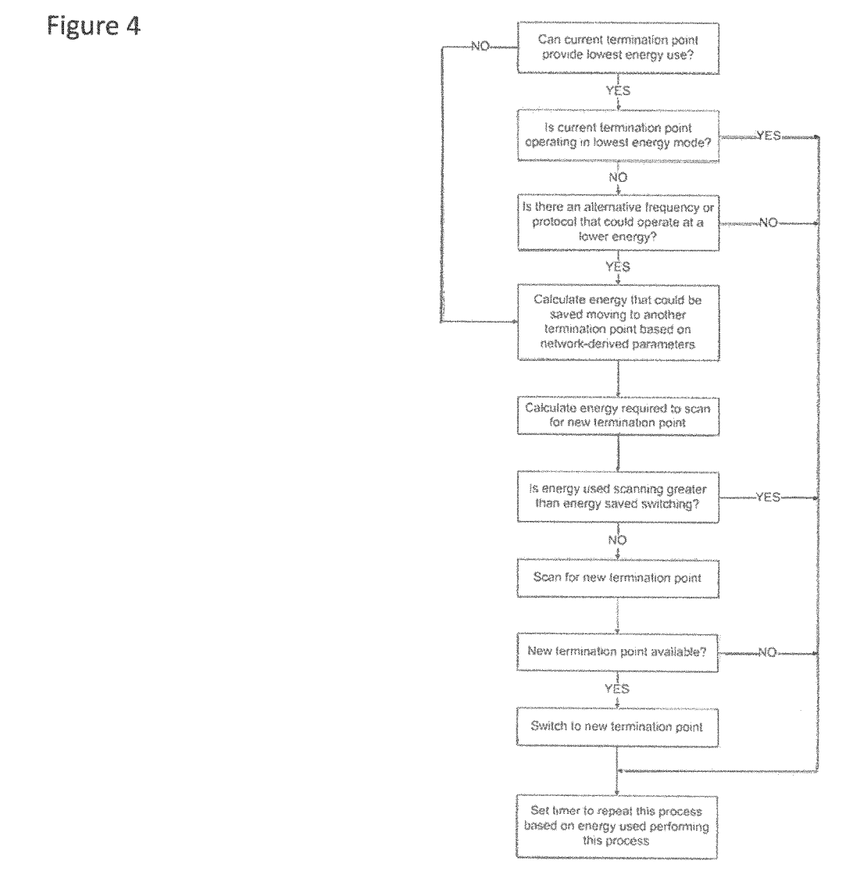
FIG. 4 shows a method of optimising battery life in a wearable device

FIG. 4 shows a method by which the available and derived parameters may be used to manage the optimum use of battery in the wearable device 10. On expiry of a timer, the processor of the wearable device 10 checks the status of the current mode. If it is the lowest energy mode and operating at its lowest energy configuration then the processor does nothing. Otherwise the processor calculates the energy currently being used based on network-derived parameters. Based on this calculation, if there is no energy benefit from moving to another mode then the processor does nothing. Otherwise the processor calculates the energy that could be saved moving to another termination point based on available network-derived parameters. Frequent switching between modes, which uses energy, can thus be avoided. The processor calculates the energy required to scan for a new mode based on the probability that it will be available. If the calculated energy required to scan is greater that the calculated energy to be saved then the processor does nothing. Thus, energy used by scanning for a new mode can be reduced. Otherwise the wearable device 10 is caused to scan for a new mode and switches if found. Before exit from any of the above, the processor calculates how much energy was consumed performing this check and sets a timer that triggers the next check. The timer will be based on the energy used for the check compared with the potential energy saving switching modes.

In addition or alternatively to the method shown in FIG. 4, the wearable device 10 may decide which termination point to use based on interference affecting the quality of the communication link. This is also beneficial for energy conservation, since the device does not try to repeatedly connect with a termination point when the radio link between the wearable device 10 and the termination point is subject to sufficient interference to cause the link to fail.

If the wearable device 10 is operating on a first frequency band or protocol and detects interference from another frequency band or protocol, it may choose to switch its operation to a frequency band or protocol which is less vulnerable, at that moment, to interference from the respective band or protocol than the first. That is, the transceiver of the wearable device may operate on a frequency band or protocol which has less interference from the respective band or protocol which is causing interference. In the particular case where mode 1 is ISM radio network at 869 MHz and mode 2 is Bluetooth there is a potential for interference from an LTE device which may cause the mode 1 radio to stop working. The most likely cause of interference will be a nearby mobile phone handset and the owner of the handset may also be the owner of the system using the mode 1 radio. In these circumstances, a Bluetooth pairing with the handset that is causing the interference may then provide the connectivity previously provided by the mode 1 radio. The processor of the wearable device 10 may cause the transceiver to switch from the ISM radio network, terminating at access point 30, to the Bluetooth link, with the smartphone terminal 20 as the termination point for the link. In this case, as the interference from the LTE device gets stronger (and the ISM link breaks down), the Bluetooth LE (Low Energy) may be getting stronger because the connection terminates at the phone 20 which is causing the interference. Therefore mutually beneficial circumstances exist that the link to the database can be made using the phone as a termination point through the BT LE link and on through the 4G link (causing the interference) with benefits to reducing the energy burden on the body-worn band.

The wearable device 10 will derive information relating to the energy required to switch to a different termination point based on energy required at least to detect a given radio frequency and/or protocol, establish a connection to the termination point, and transmit and receive the data required by the application using that frequency and/or protocol of the termination point. If the wearable device 10 determines that less energy will be used by switching to a different termination point the wearable device 10 will perform the switch.

The wearable device 10 can determine the parameters to perform the energy calculation based on packet or frame-error count. Alternatively, or in addition, the parameters may be provided by the database 50 which will use data from multiple users to refine these parameters. The database 50 may provide information not available to the wearable device 10. If an access point 30 is not available, for example, because it is malfunctioning or has been removed from the network, the database 50 can inform the wearable device 10 not to include this access point 30 in its calculations.

If the wearable device 10 calculates that less energy will be used by moving to another frequency and/or protocol it will switch to the new frequency and/or protocol. This ensures that if the available connection to one terminal is less than optimal the transceiver 150 can switch to a more optimal connection, but will not switch at the expense of power usage.

The database 50 receives signals from the wearable device 10 via either the access point 30 or the user's smartphone terminal 20. The access point 30 and smartphone 20 act as a portal. The processing of the data provided by the wearable device 10 sensors is carried out at the database 50. The database 50 provides the system logic and provides instructions to the wearable device 10.

In use, the wearable device 10 can generate an alert from any one of, or a combination of, triggers. A trigger can be user initiated. For example, a user may press one or more than one of the input buttons. A particular response pattern may be required. For example, the user may have to press a button twice, the user may have to press two buttons at the same time or in a predetermined pattern, or may have to press the buttons for a predetermined length of time or using a predetermined amount of pressure. This ensures that it is more difficult to accidentally activate the user alarm. An alternative to using buttons as a means of user input is to detect single or multiple taps or a pattern of taps using the accelerometer.

Alternatively, a trigger may be automatic. For example, the accelerometer may detect motion indicative of a fall. Alternatively, the accelerometer, as motion detector, may indicate that no motion has been detected for a predetermined amount of time. An alert may also be triggered by an abnormal reading from any one of the other parameter sensors included in the wearable device 10.

In a supplemental, or alternative mode, the wearable device 10 may provide a regular wellness check, via the haptic vibrator, to which the user must respond, either using the device for example, by activating the input buttons on the device, or moving the device in a movement pattern identifiable by the accelerometer or via an external method of communication such as making a call or sending a text message. If no response is received to such a wellness check, an alert may be triggered. The wearable device 10 may transmit a periodic signal independently from a user input, for example to provide an indication that the device is being worn or is functional.

If an alert is triggered, then a series of events takes place. The central database 50 can cause the wearable device 10 to vibrate or provide other feedback to the user and/or the user's home and/or mobile phone to be called, indicating that an alert is about to be triggered and offering the opportunity to the user to cancel the alert. The user may respond to the alert via the device as described above or via an external method of communication.

If there is no response from the user, or the alert is not cancelled, the central system will send an alert to a series of contacts on a configurable calling list until a response is received.

Owing to the presence of the proximity sensor 120 on the wearable device 10, the band will not be set off by a false reading when the user is not wearing it. For example if the band is thrown across the room, the accelerometer may detect readings suggesting a fall has occurred, or if the band is left on a table for an amount of time which may trigger a no motion reading.

The provision of a proximity sensor 120 can also be used to help conserve energy source or battery life; the band may power down if it is not being worn. If the proximity sensor 120 determines the absence of a user, it may begin low duty cycle operation. The transceiver 150 may transmit a low duty cycle watchdog message. The message may be a periodic transmission and may be used to indicate that the device is not being worn. The low duty cycle watchdog message may be transmitted at a rate which is lower than the rate of a periodic transmission when the proximity sensor 120 detects the presence of a user. The low duty cycle watchdog message may also be transmitted when the battery or energy source is reaching the end of its lifetime, regardless of whether the device 10 is being worn. Thus, energy used causing periodic transmissions is reduced, thereby extending the life of the battery or energy source. In the low duty cycle, the hardware of the wearable device 10 may be caused to operate in a low power mode. This feature can be advantageous if the band is to be stored for any length of time subsequent to its manufacture but before it is setup for a user.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The software for the access point 30 and the wearable band 10 can be sent from the database 50 to the access point 30, and the software update for the band 10 can be applied by an over-the-air update, via the ISM radio link. When the access point 30 has a software update for the band the user may be instructed to put the band 10 in proximity to the access point 30. Thus the signal from the access point 30 to the wearable band 10 may be stronger and the update can be made at a much higher data rate than normal. That is, the update may be completed in as short a time as possible to reduce the energy burden on the batteries.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims, e.g., there is a further embodiment comprising a combination of one or more embodiments with any of the other embodiments previously discussed.

The invention claimed is:

1. A wearable device comprising:
a processor;
at least one transceiver;
a sensor configured to sense the presence of a user;
an energy source for powering the at least one transceiver, processor, and sensor, wherein the processor is configured to cause the at least one transceiver to transmit information indicative of a presence of a user, and wherein the energy source is configured to reduce its power output when the sensor configured to sense the presence of a user confirms the absence of a user, and wherein the at least one transceiver is configured to transmit a signal at a first time interval, and wherein the transceiver is configured to transmit a signal at a second time interval when the user presence sensor confirms the absence of a user, wherein the second time interval is greater than the first time interval.

2. The wearable device according to claim 1, wherein the sensor configured to sense the presence of a user comprises a capacitive skin sensor.

3. The wearable device according to claim 1, wherein the apparatus comprises a sensor for detecting a body parameter.

4. The wearable device according to claim 3, wherein the apparatus comprises at least one of an accelerometer and a temperature sensor.

5. The wearable device according to claim 1, wherein the apparatus comprises an LED for visual feedback or a speaker for audible feedback.

6. The wearable device according to claim 1, wherein the apparatus comprises a vibrator for providing haptic feedback.

7. The wearable device according to claim 6, wherein the vibrator is of adjustable intensity.

8. The wearable device according to claim 1, wherein the energy source comprises at least one battery.

9. The wearable device according to claim 8, wherein the apparatus comprises a vibrator for providing haptic feedback, wherein the vibrator is of adjustable intensity, wherein the processor is configured to cause the intensity of the vibrator to stay constant as the battery power decreases.

10. The wearable device according to claim 1, wherein the processor configures all other sensors into low power mode when the user presence sensor confirms the absence of a user.

11. The wearable device according to claim 1, comprising a user input device, wherein the user input device comprises at least one of a switch, a temperature sensor, a voice input device and an accelerometer.

12. The wearable device according to claim 1, wherein the at least one transceiver is configured to operate on one of two or more frequency bands or protocols.

13. The wearable device according to claim 1, wherein the apparatus comprises a first transceiver configured to operate on a first frequency band or protocol and a second transceiver configured to operate on a second frequency band or protocol.

14. The wearable device according to claim 1, wherein the transceiver is configured to transmit a signal in response to one of a received signal or a user input.

15. The wearable device according to claim 1, wherein the transceiver is configured to transmit a signal in response to a sensor reading outside an allowed range.

16. A method comprising:
using a sensor of a wearable device to confirm the presence of a user; and
causing information indicative of a user status to be sent from the wearable device to a device connected to the interne if the user presence is confirmed, wherein the information is transmitted at a first time interval;
reducing the power of an energy source when the sensor confirms the absence of the user, wherein the information is transmitted at a second time interval when sensor confirms the absence of a user, wherein the second time interval is greater than the first time interval.

17. A non-transitory computer program product comprising computer executable instructions which when run are configured to perform the method of claim 16.

* * * * *